United States Patent [19]

Hoebing

[11] Patent Number: 4,669,812
[45] Date of Patent: Jun. 2, 1987

[54] METHOD AND APPARATUS FOR 3-D IMAGE SYNTHESIS

[76] Inventor: John L. Hoebing, 5635 S. Maryland, Chicago, Ill. 60637

[21] Appl. No.: 531,040

[22] Filed: Sep. 12, 1983

[51] Int. Cl.⁴ .......................... G02B 5/32; G03H 1/26
[52] U.S. Cl. .................. 350/3.73; 350/3.75; 350/3.78
[58] Field of Search .............. 350/3.75, 3.76, 3.73, 350/3.77, 3.78; 352/43, 61; 358/90

[56] References Cited

U.S. PATENT DOCUMENTS

| | | | |
|---|---|---|---|
| 3,428,393 | 2/1969 | de Montebello | 352/43 |
| 3,462,213 | 8/1969 | de Montebello | 352/86 |
| 3,493,290 | 2/1970 | Traub | 350/174 |
| 3,586,412 | 6/1971 | Leith | 350/3.5 |
| 3,608,993 | 9/1971 | De Bitetto | 350/3.76 |
| 3,743,376 | 7/1973 | Russell | 350/3.5 |
| 3,765,741 | 10/1973 | Kimura et al. | 350/3.75 |
| 3,807,829 | 4/1974 | Close | 350/3.5 |
| 4,054,356 | 10/1977 | Noguchi | 350/3.5 |
| 4,094,577 | 6/1978 | Spitz et al. | 350/3.72 |
| 4,130,832 | 12/1978 | Sher | 358/89 |
| 4,190,856 | 2/1980 | Ricks | 358/88 |
| 4,394,063 | 7/1983 | Weiss et al. | 350/3.75 |

FOREIGN PATENT DOCUMENTS

2218384 11/1973 Fed. Rep. of Germany.

OTHER PUBLICATIONS

Yakimovich, A. P., Three-Dimensional Holographic Display, Kavantovaya, Elektronika, vol. 8, 143–147 (Jan. 1981); English Translation found in Sov. J. Quantum Electron 11(1) 78–81 (Am Inst. of Physics).
Leith, E. N., White-Light Holograms, Scientific American, Oct. 1976, pp. 80–95.
Close, D. H., Optically Recorded Holographic Optical Elements, ch. 10, Handbook of Optical Holography, pp. 573–585.

*Primary Examiner*—Bruce Y. Arnold
*Attorney, Agent, or Firm*—Jacques M. Dulin, Ltd.

[57] ABSTRACT

Method and apparatus for production of 3-D images (volume displays) from a set of 2-D images employing one or more multiple component holographic optical elements (mcHOEs) in combination with an off-axis array of a plurality of 2-D illuminated (or radiative) components of objects to be synthesized into 3-D images of the objects. An array of component regions is disposed in at least one plane generally normal to a defined optical axis. A mcHOE is disposed in a plane parallel to the plane of the array with the optical axis passing therethrough. The components are illuminated from behind, or are themselves radiative (as, for example, in the case of CRT screen(s)). The observer is positioned along the optical axis in front of the mcHOE. The mcHOEs are virtual image transmission or reflection holograms, but real images may be produced by using the appropriate mcHOE. The component region array is a set of 2-D representations of portions of an object (e.g., each member of the array being a section of the 3-D object to be reconstructed at a unique depth within the object). The component regions are successively illuminated, presented or turned on (in the case of a radiative region), by a light source having a narrow wavelength band substantially similar to that by which the mcHOEs were made. Diffuser screens and/or filters may be employed. When the rate of illumination of each number of array in sequence exceeds the flicker fusion threshold of the observer, the individually projected planes of the array fuse into a 3-D image. By a variety of techniques, the invention is adaptable to applications in various fields, including scientific, technical, medical, entertainment, educational, commercial and advertising. Specific examples shown include real image production, rotation or translation of reconstructed 3-D object images, 3-D holographic television, conjugate back focal plane hologram microscope, interactive 3-D holographic game devices, and the like.

78 Claims, 6 Drawing Figures

METHOD AND APPARATUS FOR 3-D IMAGE SYNTHESIS

BACKGROUND OF THE INVENTION

1. Field

The invention relates to methods and apparatus for producing three-dimensional (3-D) images (volume displays) from a set of 2-D images, and more particularly to the use of off-axis diffractive optical elements (preferably multiple component holographic optical elements called mcHOEs herein) in special combination with an off-axis array of a plurality of illuminated (or radiative) components of objects to be synthesized into 3-D images of the objects themselves. The invention is useful in a wide variety of modes, including but not limited to, applications in scientific, technical, medical, entertainment, educational, commercial and advertising fields, and more particularly to volume microscopy, 3-D tomogram synthesis, 3-D games, and 3-D holographic television and movies, to name a few.

2. Description of the Prior Art

Apparatus for realistically presenting three-dimensional images of objects have been explored extensively since the beginnings of photography. Excellent reviews of the progress of this endeavor, ranging from stereophotography to holography, are available; for instance in *Three Dimensional Imaging Techniques* by T. Okoshi.

One particular trend in three-dimensional imagery concerns synthesizing a 3-D image of an object from a set of representations of components of that object; a typical, example of this technique is provided in U.S. Pat. No. 3,428,393, for instance. That patent describes the basic goals of this prior art and provides a description of the range of objects that can be synthesized and the kinds of components of an object that can be used in the synthesis. A brief review of the goals of the prior art and some definitions of terminology will be made here for the purpose of this exposition.

An "object" is in general any three-dimensional collection of points to which some value relating to intensity can be assigned; it may be described by a mathematical formula or in a computer as a set of points, or it may be a physical object such as a biological specimen. Components of that object are any subset of the points comprising the object, and a representation of the component is some physical embodiment capable of effecting a wave front corresponding to the points of the component. For instance, the object may be a biological specimen, the components may be serial sections made through the object with a microtome, and the representations of the components may be photographic transparencies of these sections. In another instance, the object may be a set of points in a computer corresponding to a computerized axial tomography generated portrait of the 3-D distribution of body density in a patient. The components may be the set of 2-D intensity pictures generated by mathematically intersecting a plane at various depths within the 3-D collection of points, and the representations of the components may be intensity modulated regions of phosphor on the face of a CRT, or a photographic transparency of such a CRT screen. The goals of the synthesis of an image of the object from the representations of the components is to provide an observer with an image of each of the components in such a way as to create an effect of a single 3-D distribution.

A wide range of physical embodiments of this idea have been proposed. The prior art techniques all require moving parts to effect the synthesis. In some methods, an image of the different planar sectional components of an object is focused onto a screen, and some part of the system moves to create, for successive sections representing different depths within a specimen, an image of the screen at different distances from the observer. When this process is performed at a frequency above flicker fusion, an image of all components is visible simultaneously at their appropriate relative depths; this set of images comprises the 3-D object image. In other systems, for example, those described in U.S. Pat. No. 3,493,290, an optical element is deformed, and this changes the focal length of the element: components viewed with a different focal length appear to be a different distance from the observer. When the process of presenting different object components to different focal length optical elements (i.e., the same element in different states for deformation) occurs above the flicker fusion rate, one sees all components simultaneously, at a distance corresponding to the position within the object which the component would occupy.

Aside from the moving parts, bulkiness and expense of the above embodiments, the problem exists of presenting the different component images to the system, and thereby to the observer. This problem has been approached by others in a number of ways. In one approach the representations of the object components may exist physically separately, and are presented to the input aperture of the viewing system by physical movement of the representations, as in a moving film loop; or the representations may remain motionless and be imaged by a moving optical element, such as a rotating prism; or they may reside on a CRT screen, in which case successive components are displayed at different times on the CRT. All of these prior art methods require complicated apparatus to assure a synchronization of the presentation of the components to the viewing apparatus at the precise moment when the image of that component will appear at the proper depth within the complete 3-D image.

In the deformable mirror varying focal length system, the components are successively displayed on a CRT. The electronics bandwidth required to refresh the CRT once for each object component while meeting the flicker fusion repetition requirements is a limiting factor in the achievable resolution of each component, and hence of the final object image. One cannot use a number of CRT-electronics assemblies "in parallel" to increase the effective bandwidth, because only one CRT can exist at the input aperture of the deformable optical element. At the present time, the bandwidth of the CRT circuitry is the limiting factor for final object image resolution.

The prior art does not provide any technique for creating an image of a 3-D object by operating on representations of object components without the use of moving parts and complex synchronization mechanisms; nor does the prior art describe any technique for synthesizing the image of a 3-D object by acting on all object components simultaneously. Other patents which do not either address the problems or provide for solutions of the type herein are U.S. Pat. Nos.: 3,743,376; 4,094,577; 4,190,856; 3,493,290; 4,130,832; 3,807,829; 4,054,356; and 3,462,213. Basic background in the holographic field may be found in "White Light Holograms," an article by Emmett N. Leith in *Scientific*

*American,* Oct. 1976, pp. 80–88, 92–95; and *Handbook of Optical Holography* (Academic Press 1979), Ch. 10.8, "Optically Recorded Holographic Optical Elements" by Donald L. Close.

THE INVENTION

Objects

It is among the objects of this invention to provide a method and apparatus for 3-D image synthesis that is adaptable to a wide variety of fields, including but not limited to the scientific, technical, medical, entertainment, education, commercial and advertising fields.

It is another object of the invention to employ off-axis multiple component holographic optical elements in a special combination with an array of object component regions to synthesize a 3-D virtual or real image thereof.

It is another object of the invention to produce a 3-D virtual or real image of an object from a series of 2-D section component regions thereof employing off-axis multi-component holographic optical elements.

It is another object of the invention to produce 3-D images which may be selectively movable (such as rotation or translation in a 3-D field), or parts of which may be selectively and/or sequentially illuminated, colored, darkened, dissolved or eliminated, added, highlighted, brought in or out of focus, and the like.

It is another object of the invention to provide a method and apparatus for 3-D holographic television.

It is another object of the invention to provide a method and apparatus for 3-D image synthesis without the need for complex motion of mechanical elements.

It is another object of this invention to provide a multiple component diffractive optical element that is especially suited for imaging the wave fronts from all representations of object components to form an image of each component in a unique place, the collection of all such images comprising the image of the 3-D object; and it is a particular object of this invention to describe holographic techniques for creating such a diffractive optical element.

It is another object of this invention to provide a holographic multiple component diffractive optical element having means for limiting the entrance pupil of each element so that it will image only the wave front corresponding to one object component leaving substantially unaffected the wave front of other components, and to provide methods and apparatus for making these elements.

It is another object of the invention to provide a method and apparatus for volume microscopy, and more particularly a conjugate back focal plane hologram microscope and its employment in volume microscopy.

It is another object of the invention to provide a method and apparatus for 3-D imaging of a series of 2-D images each representing a different and adjacent depth in an object, such as a series of tomogram "slices" of a human body or organ.

It is another object of the invention to provide a portable 3-D viewer having a simple and convenient means for changing the set of object component representations to change the 3-D object images synthesized therefrom.

It is still another object of this invention to provide methods and apparatus for synthesizing 3-D images employing one or more CRT screens or moving picture screens to represent the object components or component regions, and more particularly to provide 3-D holographic television and movies.

It is another object of the invention to provide methods and apparatus for selectively and/or sequentially illuminating different component regions with different intensities or wavelengths of light to properly synthesize a 3-D image within the flicker fusion duration limits, or to highlight, identify, or render dynamic various component regions of the 3-D synthesized images.

It is another object to provide methods and apparatus to change the component region illumination intensity distribution in a time-varying function to create psychophysical image interpolation within the flicker fusion duration limits.

It is another object to provide methods and apparatus to provide interactive user control of various parameters of the 3-D imaging system of the invention including illumination, color and/or intensity, selection of component region or portion thereof to be illuminated, sequence of illumination, rate of sequencing and the like.

It is another object of the invention to provide methods and apparatus for correcting chromatic aberrations of diffractive optical elements to assist in providing full or selective color 3-D images.

Still further and other objects of the invention will become apparent from the detailed description which follows.

SUMMARY OF THE INVENTION

Method and apparatus for production of 3-D images (volume displays) from a set of 2-D images employing one or more multiple component holographic optical elements (mcHOEs) in combination with an off-axis array of a plurality of 2-D illuminated (or radiative) components of objects to be synthesized into 3-D images of the objects. An array of component regions is disposed in at least one plane generally normal to a defined optical axis. A mcHOE is disposed in a plane parallel to the plane of the array with the optical axis passing therethrough. The components are illuminated from behind, or are themselves radiative (as, for example, in the case of CRT screen(s)). The observer is positioned along the optical axis in front of the mcHOE. The mcHOEs are virtual image transmission or reflection holograms, but real images may be produced by using the appropriate mcHOE. The component region array is a set of 2-D representations of portions of an object (e.g., each member of the array being a section of the 3-D object to be reconstructed at a unique depth within the object).

Component regions are preferably any 2-D representation of a section of a region or field (comprising a viewed space which may or may not contain one or more objects) such as transparencies, prints, areas of a screen (such as a CRT, moving picture or still picture screen), image from another optical system, an imaged computer construct on a screen, or sections of a real object, or the like. The component regions may be 1, 2 or 3 dimensional, may be an actual object or a real or virtual image from other optical systems, a hologram or other 3-D image.

The component regions are successively illuminated, presented or turned on (in the case of a radiative region), by a light source having a narrow wavelength band substantially similar to that by which the mcHOEs were made. Diffuser screens and/or filters may be employed. When the rate of illumination of each number of array in sequence exceeds the flicker fusion threshold of the observer, the individually projected planes of the array fuse into a 3-D image.

By a variety of techniques, the invention is adaptable to applications in various fields, including scientific, technical, medical, entertainment, educational, commercial and advertising. Specific examples shown include real image production, rotation or translation of reconstructed 3-D object images, 3-D holographic television, conjugate back focal plane hologram microscope, interactive 3-D holographic game devices, and the like.

The hologram need not be planar, and may be a coating on a windshield, eye glasses, view screen, helmet visor and the like so that 3-D off-axis display of computer-generated readouts may be generated. This has application for display of speed, range, bearing, and the like, during vehicle operation.

The hologram may be transmissive or reflective, and in the latter case may be coated on an opaque substrate which need not be planar.

While a volume hologram formed by two point sources is preferred, the holograms of this invention may be phase/amplitude holograms or extended field holograms, and may be formed from a point and small disc. The mcHOEs can be used in conjunction with other optical elements (lenses, mirrors and other holograms), may be color corrected, counterabberated.

The component regions can be time and spatially multiplexed to produce holographic 3-D TV in which the synthesized 3-D object can be controlled to change position, color and form. Illumination and color are controlled by selectively illuminating component regions (or parts thereof) or by time variable sequencing. Interactive controls are disclosed for video or arcade games. N-component region illumination control, continuous, slow motion or rotation of an object 3-D image can be produced. Electronic control is disclosed to assist in integrating (improving the resolution of) the 3-D image where the number of component regions or HOEs is few.

BRIEF DESCRIPTION OF THE DRAWINGS

The principles of the invention are illustrated by reference to the drawings in which.

DETAILED DESCRIPTION OF THE BEST MODE OF THE INVENTION

The following description illustrates the invention by way of example and not by way of limitation of the principles of the invention. This description will clearly enable one skilled in this art to make and use the invention, and describes many embodiments, adaptations, variations, and uses of the invention, including what I presently believe is the best mode of carrying out the invention.

THE FIGURES AND SPECIFIC EXAMPLES

Figure 1:
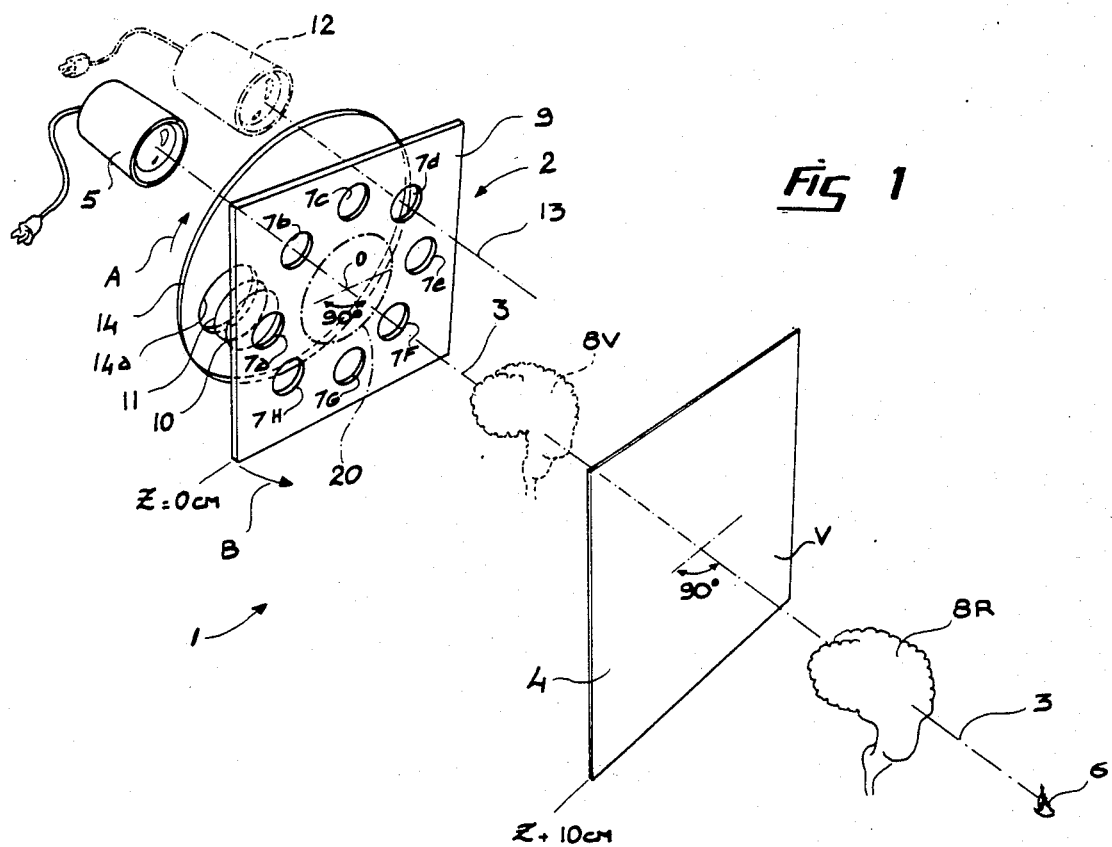
FIG. 1 illustrates in perspective one embodiment of the system of the invention for synthesizing a 3-D image using a transmission diffractive optical element, here a multi-component Holographic Optical Element, and a single monochromatic light source.

Referring first to FIG. 1, the 3-D imaging system 1 of the invention comprises an array of component regions 2 placed in a plane generally normal to a defined optical axis 3. Spaced from the array 2 is a diffractive optical element 4, in the best mode being a multi-component holographic optical element (herein mcHOE) of an off-axis volume hologram type. The mcHOE 4 is also oriented generally normal to the optical axis 3. In this embodiment the mcHOE is a transmission type volume hologram. A monochromatic light source 5 is oriented on the optical axis and disposed behind the array 2, and the observer 6 is positioned along the optical axis in front of the mcHOE 4.

The HOEs employed herein are made with two point sources of diverging light. For initial purposes of the discussion, all the mcHOEs are virtual image type transmission or reflection type holograms. By substituting the appropriate real image mcHOE in the set-ups described herein, either transmission or reflection type, one may produce a real image when desired.

The component region array 2 comprises a set of 2-D representations, 7a through 7h in this example, of an object, each representation corresponding to a section of the 3-D object to be reconstructed in the synthetic 3-D image at a unique depth within it. For example, the set of representations 7a–7h may be a series of transparencies of sections of the 3-D object, the sections being taken normal to the direction of view, which view is aligned in FIG. 1 parallel to the optical axis. As shown in FIG. 1 for illustrative purposes, the transparencies 7a–7h are successive adjacent tomograms or photomicrograph transparencies of an organ, in this case a brain, with each tomogram or photomicrograph being taken at a successively different location (depth) along a rear-to-front direction. That direction is coincident with the optical axis in the reconstructed image 8R or 8V. If the direction of preparation of the successive tomogram sections were from the top of the brain to its base, the top of the brain would be viewed along the optical axis 3, that is, the top of the brain image 8R or 8V would be facing to the right in FIG. 1.

There are a plurality of 2-D component regions in the array 2, and may be more or less than the eight shown in FIG. 1. As described in more detail below in the section on Component Regions, the component regions may be any 2-D representation of a section of a region or field (comprising a viewed space which may or may not contain one or more objects) such as transparencies, prints, areas of a screen (such as a CRT, moving picture or still picture screen), image from another optical system, an imaged computer construct on a screen, or sections of a real object, or the like.

Figure 2:
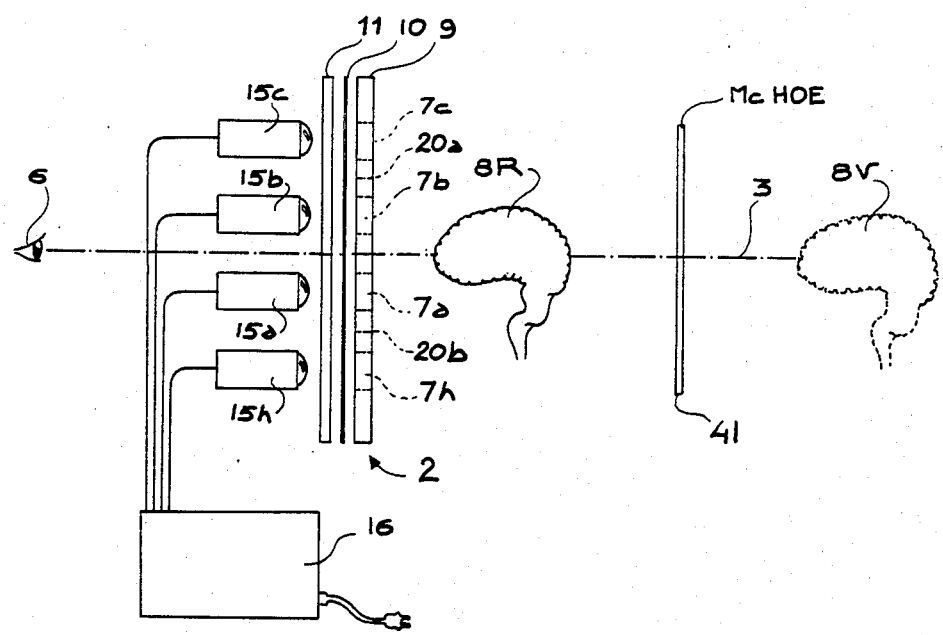
FIG. 2 illustrates a side view of another embodiment of the 3-D imaging system of the invention employing a reflective diffractive optical element and a plurality of controllable lights to illuminate the component regions as desired.

In FIG. 1 the eight 2-D transparencies are arranged on a plane surface, in this example, an opaque holder sheet 9 having uniformly spaced apertures for receiving the transparencies 7a-7h. Where, for example, the transparencies in this example are 2-D photomicrographs of a specimen at successive intervals, say one micron intervals, with a depth of focus of 1+ micron for each picture, they will form a continuous image 8R or 8V representing 8 microns (actually about 9 microns) of depth of the specimen.

Where the light source 5 is white light, an optical filter 10 is placed just behind (between the transparency 7a and the light source 5) to select a narrow wavelength band substantially the same as that with which the mcHOEs are made. A ground glass or other diffuser screen 11 is then placed intermediate the filter and the transparency. Where the light source 5 is monochromatic, a filter is not needed. Each of the transparencies has a diffuser screen and/or filter disposed adjacent it. In the alternative, single sheet diffuser screens 11 and filter 10 may be used (see FIG. 2).

Where a single, axial light source 5 is employed, the entire 3-D image will be shown at 8R or 8V, when opaque strobing disc 14 is rotated as shown by arrow A. This disc has an aperture 14a disposed so that on rotation each successive transparency is illuminated. In another embodiment a single light source 12 (shown in phantom in FIG. 1) is disposed spaced from but parallel to the axis 3 along an axis 13 which is the axis of the transparencies. The entire holder can then be rotated around axis 3 as shown by arrow B, and each successive aperture containing the sequenced set of transparencies 7a-7h is illuminated in turn. In either case, each transparency is in effect "turned on" and off in sequence. When the rate of rotation of the apertured disc 14 or the holder 9 exceeds the flicker fusion threshold of the observer 6, the individually projected planes 7a-7h will fuse into the 3-D image at 8R or 8V. In the alternative, rather than rotating the transparency holder 9 or the apertured strobing disc 14, a plurality of individual lights 15a-15h are placed, one behind each transparency, as shown in FIG. 2. The illumination of each light is sequentially controlled (strobed) by the lighting control 16 at a rate which causes perceptual fusion (to the viewer) of the individual planes into a 3-D image. Were all the transparencies evenly illuminated, the viewer would see 8 discreet planes each at a slightly different depth in the image region 8R or 8V, rather than a continuous, fused 3-D image. The illumination may be turned on and off by any variety of modes; three have been shown by way of example. Alternatively all that is required is a relative brightening and dimming. There may be a basic background lighting level for all transparencies (FIG. 2) with a sequential brightening of each bulb in sequence to provide the fusion. If the sequencing is too slow, the planes will flicker and no fusion will result.

Returning now to FIG. 1 and turning attention to the diffractive optical element 4, this element is preferred to be a multi-component holographic optical element (abbreviated mcHOE) which may also be referred to as the imaging hologram. This hologram is preferred to be a volume hologram containing one off-axis holographic optical element for each 2-D component regions on the object plane, in this instance the transparencies 7a-7H contained in the plane of the array of component regions 2. This image hologram 4 is constructed in such a way that each of its component HOEs causes an image of one of the set of 2-D component regions (the transparencies 7a-7h and the holder sheet 9) to appear centered along the optical axis 3 and at a unique depth along that axis. The superposition of all such image planes in the image regions 8R or 8V at various depths along the axis 3 constitutes the synthesized 3-D image.

As evident from FIG. 1, each of the component transparencies 7a-7h are spaced apart angularly around the periphery of the holding sheet 9 by 45° angle. The imaging hologram 4 may be constructed of a 10×10 cm plate of photosensitive material, for example, a 649F plate or a dichromated gelatin layer (preferred). When the side labeled V is placed toward the viewer 6, a virtual image will appear at position 8V. When a real image type transmission or reflection type mcHOE is placed in position of hologram 4, a real image will appear in the image region 8R. The preparation of the imaging hologram 4 will be described in more detail below in the section on manufacture of the mcHOEs.

Turning now to FIG. 2, this example employs a reflection hologram 41 in place of the transmission hologram 4 of FIG. 1. In this case, the observer 6 views through a large aperture 20 in the center of the holder sheet 9. This aperture is shown in FIG. 1 in phantom to assist in the understanding of the embodiment of FIG. 2 although it is not used in the embodiment of FIG. 1. The lines 20a and 20b in FIG. 2 delineate the edge of the aperture 20 in the holder sheet 9. As described above, an optical filter 10 and ground glass sheer 11 may be employed in conjunction with the light sources 15a through 15h. The lighting is controlled as above described to help provide flicker fusion sequencing. In this case, with an appropriate real image reflection type mcHOE at position 41, there will be synthesized a 3-D real image in the image region 8R. When the mcHOE is a virtual image reflection type at position 41, a 3-D virtual image will appear at the position 8V.

Figure 3:
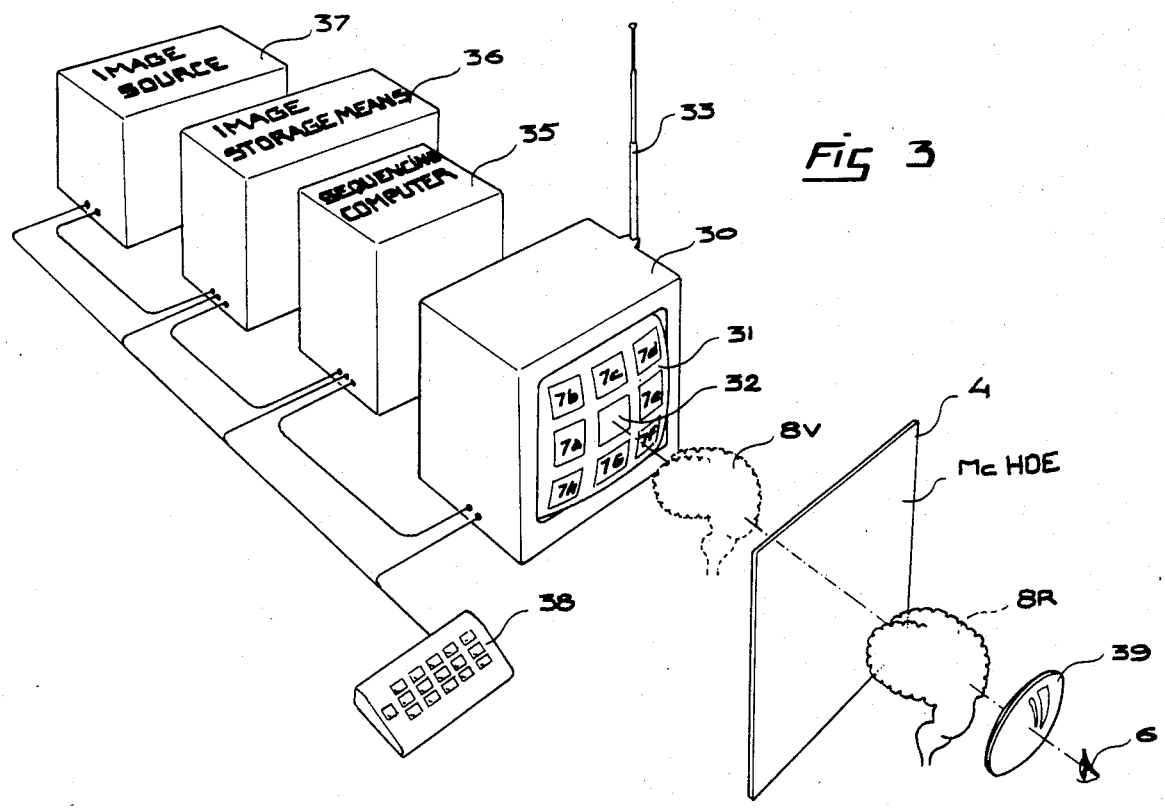
FIG. 3 illustrates in perspective the 3-D imaging system of the invention employing a screen display, such as a CRT or moving picture screen, as the illuminated component region array forming means to produce real or virtual images with a transmission mcHOE, forming the basis for 3-D holographic TV and movies.

The embodiment shown in FIG. 3 employs a screen display means 30 for display of and illumination of the component regions in a controlled manner. In this case a cathode ray tube (CRT) is interfaced with a sequencing computer 35, a component image storage means 36, and an image source 37. The sequencing computer and component image storage device 36 may be interfaced by a keyboard 38 operated by the viewer 6. The overall setup of the example shown in FIG. 3 is similar to that of FIG. 1 with a multiple lighting source of FIG. 2 being part of the operation of the CRT 30. An imaging volume transmission mcHOE 4 of the virtual image type is employed, and as before, a three-dimensional virtual image is seen at the image region 8V behind the imaging hologram. When a real image type transmission mcHOE is used, a real image appears at the imaging region 8R in front of the hologram. Auxiliary optical elements, shown here for simplicity as a single lens 39, may be used in the system for a variety of purposes, including among others, magnification, chromatic aberration control, focusing, and the like.

In this example, the image source may be any variety of devices, for example, a CAT scanner, a microscope, a seismic analyzer, one or more video cameras, an ultrasound imager, an NMR unit, or an image from any other source. It may be convenient to store the images for a subsequent scanning in component image storage device 36. This may be a device for scanning transparencies, or a computer containing digitalized density information representing numerous points of an image scanned by a densitomiter. This could also be a computer memory for storing numerical values representing densities, color value and the like of a two-dimensional plane which has been constructed more arbitrarily by an artist, or may represent mathematical point calculations of some sort.

The sequencing computer 35 displays in appropriate timing and sequence a set of related images on the CRT display unit 30. As shown in FIG. 3 by analogy to FIG. 1, seven sub-regions of the screen face 31 are illuminated in turn with the images of the transparencies 7a–7h as shown. The central region 32 is left dark for visual contrast for the viewer 6. With the appropriate sequencing control, the 3-D images appear either at region 8R or 8V as above described. The interactive keyboard 38 may be used to call up a different set of component regions (related images or transparencies) from image source 37 or storage means 36. The keyboard 38 can be used to control the sequencing computer 35 to change the illumination control, highlighting, movement, and the like. In addition, the keyboard may be interfaced to the screen display for purposes of magnification, sub-region analysis, color changes, highlighting (through contrast and brightness control), and the like.

In the alternative, the sequencing computer 35, the component image storage device 36 and the image source 37 may be eliminated and the image source with appropriate components being selected and sequenced may be received via antenna 33 (or cable, not shown) directly to the CRT screen display unit 30. In this case, the result is holographic 3-D television. By sequenced image source changes, the television may display moving, as distinct from static, pictures. Similarly, the screen may be a projection screen of some sort such as a slide projection or moving picture screen. It may either be backlighted as in FIGS. 1 and 3, or front illuminated as in FIG. 2.

Figure 4:
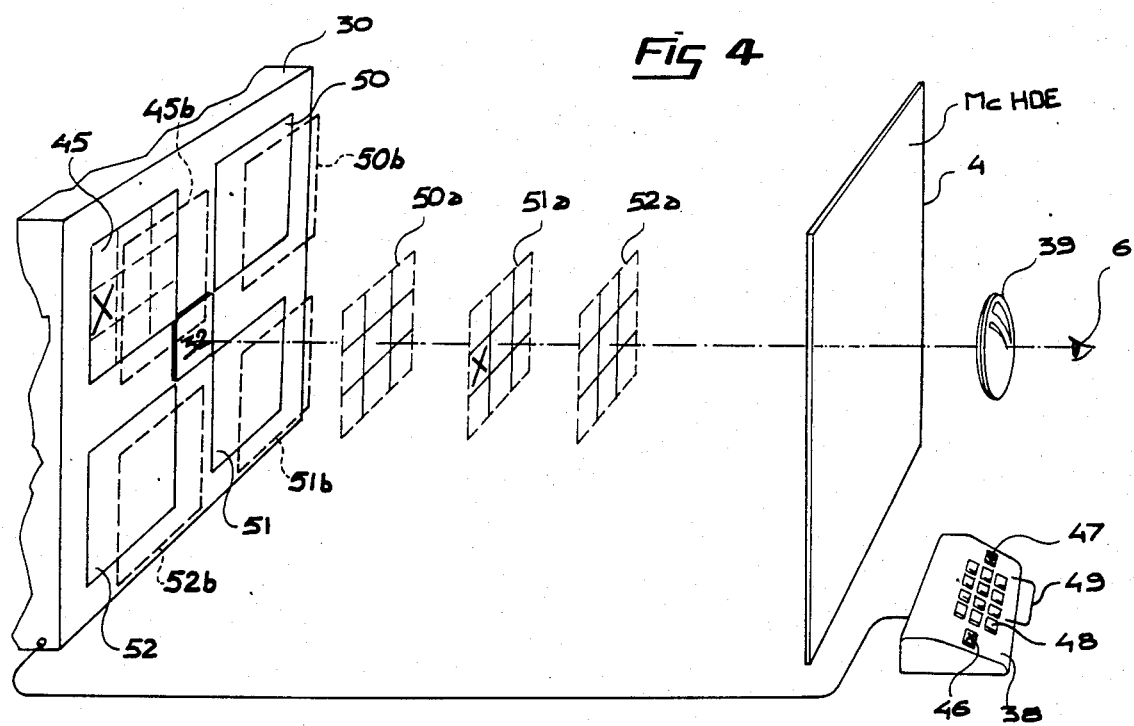
FIG. 4 illustrates schematically in perspective still another embodiment of the 3-D imaging system of the invention, this embodiment being an interactive 3-D game, such as 3-D tic-tac-toe for two players.

FIG. 4 shows still another embodiment, in this case an interactive 3-D game of the video or arcade type, in this instance being 3-D holographic tic-tac-toe. As described above, a CRT screen display unit 30 may be preprogrammed to show in component regions 50, 51 and 52, three spaced-apart images of the tic-tac-toe grid, which because of different HOE focal lengths form a three-level gridwork 50a, 51a and 52a in the visual region 8V as shown. Filters may be used as shown in phantom by 45b, 50b, 51b, and 52b. The center portion of the screen 32 is left dark to provide contrast as above described. In this instance, the mcHOE 4 comprises three HOEs of different regions 50a, 51a and 52a. The region 45 of the CRT may be specifically reserved for display of the X's or O's of the tic-tac-toe game depending on the positional input from the keyboard 38 by the players. Depending on which level 50a, 51a or 52a is called up to screens 50, 51 and 52 and depending on which marker position is indicated by the player on screen 45, the player's marker will appear in any one of the 27 possible positions. Note that the keyboard 38 has provision for player identification button 46 for player X and 47 for player O, a set of three level indicating buttons 48, and a set of nine position selection buttons 49.

In the alternative, each of the three displays 50, 51 and 52 may be selected to have not only the permanent grid showing but also keyable by the player for their markers (X or O) in any one of the 9 positions for the particular level of that component region. Still further, the marker, rather than appearing as a flat object, may be shown as a three-dimensional object by having a plurality of component regions in place of the single component region 45 to provide the three-dimensional image construct in the appropriate position. In this manner any of the currently popular video and arcade games can be converted to three-dimensional analogs and can be made interactive as well as provide for more than single player action.

Manufacture of the mcHOEs

Figure 5:
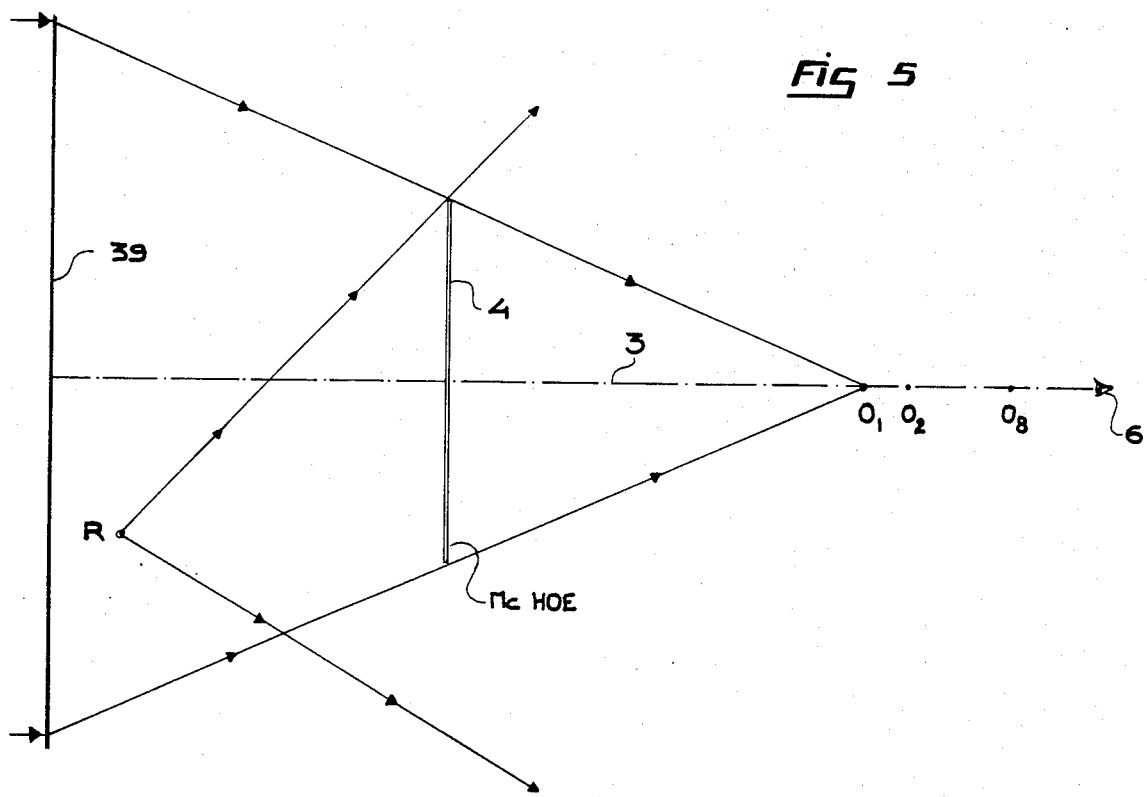
FIG. 5 is a diagram of the method of producing a transmission type real image HOE.

The method of preparation of the imaging hologram will now be described, and it is convenient to refer to FIGS. 1 and 5. The optical axis 3 that is perpendicular to the plane of the holder sheet 9, and which runs through the center of that sheet is selected as the origin, O, of the sheet. Assuming that the transparencies are on the order of 1 cm in diameter, each one is placed with its center 4 cm from the origin and at successive 45° intervals. If the initial transparency 7a is to the left of the origin along the horizontal axis as shown in FIG. 1, and the slides are successively placed in the clockwise manner, then the slide sheets, that is, the array of component regions in the holder sheet 9, will appear as in FIG. 1. The imaging hologram 4 is placed parallel to the transparency plane, that is, parallel to the holder sheet 9, with the optical axis passing through its center as well. If the distance separating the two planes is 10 cm along the optical axis 3 (hereinafter referred to as the "Z" axis), then the imaging hologram would be placed at Z plus 10 cm.

To construct the mcHOE, two positionable monochromatic light point sources having the same wavelength are required. Laser light is preferred. An argon laser is suitable for dichromated gelatin mcHOEs, and helium-neon laser of the type provided by Spectra Physics, Model 120 "Stabilite", is suitable for silver halide mcHOEs. The point source of light may be, for example, a microscope objective that focuses the plane wave beam from the laser onto a small pinhole a few microns in diameter in a sheet of metal. In the alternative, it may be the end of an optical fiber. These units may be appropriately mounted to be positioned in any desired location. One of these sources will be moved about in a plane corresponding to the Z=zero centimeter position which is the same as the transparency plane, i.e., the plane of the holder sheet. This light source will be placed at a position radially outward from the origin of the Z axis, that is, the intersection of axis 3 with the transparency plane 9 the same distance as the center of the transparency 7a–7h from the origin. These sources shall be termed "reference" sources and may be successively moved around in the Z=zero cm plane, which is the same as the transparency plane. In the alternative, the photosensitive material, for example, a 10×10 cm 649F plate or dichromated gelatin layer may be rotated in the Z+10 cm plane in 8 successive increments of 45°.

The second point source, called the "object" source, is placed on the optical axis, say at Z=+4 cm, or 4 cm in front of the plane which will hold the transparencies and in which the reference source is located. The sources are illuminated by the single laser with two laser beams being formed by a beam splitter, which beams are made to create the point sources by the objective/pinhole arrangement or the optical fiber set-up. With the sources so positioned, an exposure to produce a hologram is made. Eight separate holograms must be made, one for each of the relative positions of the object and reference sources. Thus, the exposure for each is ⅛ of the total exposure calculated for a single hologram considering the photosensitive material employed. I prefer to employ the dichromated gelatin. In the alternative, the silver halide emulsion, a 649F Kodak plate may be exposed, developed and bleached. The bleaching changes the film from an amplitude hologram into the desired phase hologram. Self-developing photopolymers of the type in which first exposure forms an object source for the second exposure are not recommended.

The first exposure is made with the reference source at the axis of the position 7a and the object source at the Z+4 cm position. This is a ⅛ exposure using silver halide emulsions, but may be a full exposure for dichromated gelatin, and the photosensitive material is not developed. Either the reference beam (point source) is then moved to the position of the center of the component region 7b, or the photosensitive material is rotated 45°, and the object beam is moved to a point along the optical axis, but now 3.5 cm in front of the transparency plane, that is, the position Z+3.5 cm. Another exposure is made, and this process is repeated for each of the remaining 6 transparency positions with the object beam progressively moved back ½ cm and the reference beam being positioned or the photosensitive material rotated so that the relative position is at the axes of component region 7C-H.

Then the photosensitive material is developed and preferably converted to a phase hologram. It is now ready for use in the configuration shown in FIG. 1 as the multicomponent holographic optical element 4. With each transparency illuminated, an observer looking down the optical axis 3 now sees a set of 8 superimposed images extending from 4 cm in front of the transparency plane to ½ cm in front. In other words, the image of the 8 micron specimen depth occupies 3.5 cm.

By making the reference source and the object source both point emitters at some points relative to the photosensitive material, one records in the film the two point interference pattern. By illuminating the processed hologram with one of the point sources, an image of the other point source will be obtained.

In holography, the interference pattern of two wave fronts is produced in a photosensitive medium. When the processed hologram is exposed to one of the wave fronts, the other one is recreated. When one wants a point source holographic optical element that will produce a real image between the HOE and the viewer, one can use as the "object" wave front one that is converging to a point, rather than diverging from a point. This is illustrated in FIG. 5, which shows lens assembly 39 is used to focus coherent light to a point $O_1$ on one side of the hologram 4. Another point source R, corresponding to the ultimate position of the component region, produces diverging light. When "playing back" the processed HOE, a diverging light placed at position R will reconstruct a real image point between the HOE 4 and the viewer 6. Note that for each separate exposure, the converging lens assembly 39 is moved to focus light successively at different points $O_2 \ldots O_8$, and the reference point R is moved to each new point corresponding to a component region in a plane parallel to the mcHOE 4. During use of the mcHOE thus produced, light from the component regions at the reference source positions will be imaged by its mcHOE to the appropriate O positions, between the HOE and the viewer.

By this process a transmission type HOE is produced. For a reflection type HOE, the reference diverging wave front originates on the other side of the hologram, on the same side as the viewer and the convergent object points $O_1, O_2 \ldots O_8$.

Such holograms are holographic embodiments of Fresnel zone plates and are termed "off axis" if either of the point sources lies off the conventional optical axis, the line perpendicular to the plane of the hologram. These holograms act as lens-like imaging devices when a change is made in the reference beam. Since the reference beam is a point source, when this point is moved a small distance in a plane parallel to the hologram, the object point is slightly displaced from the location of the original object point, likewise in a plane parallel to the hologram. Instead of moving the point sources about, the transparency is placed in a plane parallel to the hologram and centered in the place previously occupied by the reference point source. When diffusely illuminated with the same wavelength of light used in producing the hologram, each point in the slide emits a point source wave just like the original reference wave, but with an intensity modulated by the transmittance of the transparency or slide at that point. Each of these point sources from the slide or transparencies then reconstructs an image of the object point, but at a unique distance from the location of the original object point and with its unique intensity modulated by the transmittance or density of the slide or transparency at that point. Thus, an image of the transparency is formed in a plane parallel to the hologram and centered on the location of the original object wave point source.

It is important to note that the actual positions of the object and image need not correspond exactly to the positions of the reference and object beams. Any positioning of the reference and object beams defines a holographic optical element with a specific focal length, and a given HOE focal length determines the image position for any object placement, according to well known holographic lens equations. By selecting the focal length of the HOE in relation to the distance from it to the placement of the object component region, the HOE can be employed to provide a function such as image magnification.

It should be noted that the imaging characteristics of point source holograms are good in a limited region about the points at which the object and reference points existed. This is the so-called paraxial region. These images suffer from aberration as images are formed farther from the original point. These defects in image quality have been extensively studied and may be described in terms of the five conventional monochromatic aberrations: spherical aberration, astigmatism, curvature of field, coma, and distortion. In operating outside of the paraxial region, these aberrations can be cancelled, for example, by counteraberrating the creating point sources so that the resulting HOE will be an element that applies exactly the opposite (specifically the complex conjugate) aberration from the aberrations inherently in the point source HOE. The introduced aberrations may be provided by conventional lens elements, or specially made HOEs acting on the creating object point or reference point, or both. Methods of counteraberrating HOEs are conventional, and may be used to correct for aberrations in the mcHOEs used in the invention. It is to be noted, however, that while point sources are discussed herein, it is assumed that the point source wave fronts are counteraberrated, for instance, complex conjugate aberrations are introduced so that the resulting 3-D image synthesized will be free of aberrations, or multiple lateral exposures are made for each component HOE in so-called extended field holograms.

One skilled in the art will recognize that control of the effective imagable regions and efficiency of reconstruction of the 3-D object image may be effected by control of the thickness of the substrate, the amount of index of refraction modulation and the like.

The photosensitive material used to prepare the hologram may be coated on any substrate, and this substrate need not be planar. For example, coatings may be made on windshields, eye glasses, view screens, helmet visors, and the like. In the case of view screens, this would facilitate viewing of 3-D holographic television or movies by multiplicity of viewers where each viewer looks through a fixed view screen a specified distance from the television or movie screen. Likewise, coating on helmet visors would be useful for 3-D off-axis display of computer-generated readouts where the observer is looking through a helmet visor, eye glasses, or windshield at some other object. For example, while operating a vehicle, pertinent operating information such as speed, range, bearing and the like can be displayed.

Where reflective type HOEs are employed, the photosensitive material may be coated on an opaque substrate which need not be planar. Where the substrate is not planar, the positioning of the object and reference points during the preparation of the mcHOE must correspondingly compensate for the nonplanar hologram surface, or the position of the component regions may be varied so that they are not in a single slide or transparency plane. The objects of each HOE, that is, its focal length, aberrations, counteraberrations, and the like, may be used in conjunction with other optical elements or systems, including any combination of lens, mirrors, real or virtual images with suitable positioning and illumination of the corresponding object components. In these cases the mcHOE is part of a larger overall optical system which provides useful, functional extensions of the single HOE, such as image magnification, zoom capabilities, and the like.

The best mode of carrying out the invention employs a volume plane hologram made by exposing a photosensitive substance to the interference pattern of coherent light sources. However, within the principles of this invention the type of hologram is not limited. Thus, any type of hologram may be used, including those whose phase/amplitude characteristics are predetermined and explicitly computed as compared to characteristics produced by interference of light, or those in which the phase/amplitude characteristics are created by means such as a computer-controlled film plotter.

The wave fronts created by the HOE may be arbitrary, subject only to the constraint that the effect of operating on the input sets of reference beams by the wave front-transforming property of the HOE generates a set of output beams corresponding to the desired image. For example, during the preparation (manufacture) of an HOE, one beam may be a point source, and the other beam a small disc. In this case each point from a component region produces an image of a disc along the viewing direction rather than a point, and the final viewable object is the set of overlapping discs.

In some instances the angular extent of the component to be imaged may be larger than the Bragg angle acceptance of an HOE in the mcHOE, as for instance in thick phase holograms. In this case that particular HOE can be created by performing several adjacent reference-object set exposures to produce an extended field hologram. This will still produce what can be called a single HOE, but it is made by many exposures to create the desired lens or mirror analog.

Component Regions

As described above, in the present best mode of practicing the invention, the component regions may be physical objects that act on the amplitude, wavelength and/or phase of an illuminating source, which source may itself be controllable in a number of ways. As noted above, typical two-dimensional component regions may be, by way of example, transparencies, prints, drawings, paintings, and the like.

However, component regions need not be only two dimensional and may involve the modulation of points, lines, planes or volume, which is another way of saying that they may be 0, 1, 2, or 3 dimensional. Thus, holograms, actual objects, stereo "lenticular" photographs, and other synthesizing devices may be used as the 0, 1, 2, or 3 dimensional components.

Any means for producing the images used for the component regions may be employed. This includes any electro, accoustico, magneto-optical modulations of the wave front. For example, self-luminous areas or materials that are changed by some change in their ambient media or field, such as temperature-sensitive liquid crystals, may be employed. Any type of polarized light may be used for component wave fronts, and the state of polarization may be modified to provide the desired imaging characteristics.

As also described above, a synthesized image may be composed of one or more component regions. In certain instances where a component region is itself a desired image, then the image of only that component by an HOE may be the desired synthesized image. This would be, for example, where one particular level needs to be highlighted. Likewise, a related grouping of component regions may be desired to be highlighted in a more complex interrelationship of a grouping of several related sets of multiple component regions. For example, one sub-array of component regions in an entire array may be used to synthesize the three-dimensional image of a gear in an overall machine, the other parts of which are synthesized in three dimensions by other sub-arrays, all of which make up the total array from which the entire machine may be synthesized in three dimensions. This would be useful, for example, in a parts catalog, assembly or repair manual, instructional operational manual setting or the like in which each part may be illustrated separately by illuminating the sub-arrays, and then the entire machine illustrated by proper illumination in appropriate sequence of all of the sub-arrays.

The component regions may be real or virtual images from another optical system. For instance, a component region can be created from other synthesizing devices of the type described in this invention. Still another example is the production of a component region from an optical instrument, such as a microscope, telescope or the like which themselves transform some wave front before it is imaged by the mcHOE. Thus, any assembly of mirrors and lenses, whether they are conventional or holographic, may be used to preprocess a wave front before it is in turn imaged by the mcHOE as a component region. A component region may itself be a 3-D image, or a hologram thereof, or an actual object.

The application of the invention to produce a volume microscope is described in detail below. This embodiment, in summary, employs a beam splitter adjacent and in front of the objective mcHOE in the eyepiece, and a beam combiner intermediate the beam splitter and the eyepiece mcHOE. The beam splitter is preferably itself a mcHOE, each lens of which diverts the beam to a unique angle with respect to the optical axis to produce a separate off-axis real image of the specimen. The beam combiner, itself preferably a HOE, is used to coverge the divergent beams onto the mcHOE in the eyepiece. This mcHOE is placed in the conventional eyepiece, which mcHOE contains an off-axis HOE for each of the different off-axis projections of the objective lens, and each such HOE having a unique focal length to image the objective image at a particular depth. Each eyepiece image of the split-off objective wave fronts images a different depth of the specimen to a corresponding point along the optical axis and, accordingly, generates a 3-D image of the specimen.

By the above examples, it can be seen that it is possible to act on a wave front in a way impossible for a single lens. By the use of the present invention, one can associate with each component region a set of lenses/mirrors. Each component region wave front is acted on by its lenses/mirrors and its HOE in the mcHOE, and this overall system determines the total effect on the original component region wave front. Additional lenses/mirrors can follow the mcHOE as above described, and each component HOE of the mcHOE is part of a system comprising not only it but also the following optics. All of the component HOEs in the mcHOE would share the same following optics.

Color in the final synthesized image is important in many applications. Off-axis HOEs have a dispersive effect which may be corrected as noted above by another optical device or system ahead of the mcHOE to correct the component wave front dispersion so that upon emergence from the mcHOE the colors are in register. In the alternative, color may be corrected by having three separate component regions and their corresponding HOEs to image three primary colors of that particular component region in the same place so a viewer will see all three primary colors at the same time. As seen in FIG. 4 corrections may be accomplished by, for example, using one or more chromatic predispersing HOEs 45b, 50b, 51b, or 52b, shown in phantom. This is particularly useful in color holographic television applications of this invention. Likewise, known methods of color correction for single elements can be adapted to multiple component HOEs as well.

Changing the Synthesized Image in Time—Time and Space Multiplexing

In many applications of the present invention, it is desirable to display a different synthesized image at different times, for example, to show some object changing in form, position, color, and the like. This is done by synthesizing the object in its successive forms, positions, colors, etc., at successive times. One application of this is holographic television.

The best current mode of achieving this is to create a changing series of object component regions in a medium that can be changed dynamically, such as an area on a CRT screen or an array of LEDs or LCDs. For example, by electronically presenting successively different object component regions to the same areas on the CRT screen, a new object or a change in the object form, position, color, etc., is synthesized in the image region. In this example, the same HOEs are used to image the components corresponding to objects which are different in time. In the case where only a part of an object is changed, for example, rotation of a gear in a machine, only those object component regions corresponding to the changed object (here a gear) need be dynamically modified. I term this process as "time multiplexing of the object component regions."

Another way to present different objects and/or object components at different times is termed "spatially multiplexing" the object component regions to be changed in time. In this scheme, the components that correspond to the object at different times are all present simultaneously usually at different places in space; e.g., if the object component region is planar, these components would exist at different areas on the plane, such as a CRT screen. It should be noted that one then needs effectively a separate HOE in the mcHOE for each object component for each of the successive objects to be presented at successive times. Although one needs more HOEs in the mcHOE for this, an advantage is that one can present successive objects simply by controlling the illumination of the appropriate component regions needed to synthesize the desired object, e.g., one can simply control lightbulbs or CRT component regions. It must be said that one or more component regions may be needed to synthesize a given object. If that object resides whole either physically or in a hologram, then one needs only one object component region for each object, since then the object component is the object. In this simplest case one might need only one HOE for each object image to be synthesized (here synthesis is achieved just by illuminating that object).

In summary, one may use the same object-component-region-HOE set for all objects, and just present the components for different objects in the same regions but at different times (time multiplexing example). Or one may have the object components all existing at different places in space and use a separate HOE for each to image it to the appropriate place. By controlling the illumination, one may control which object is synthesized (space multiplexing). Of course, hybrids of the above two systems may be employed.

Notes About Illumination Control

As noted above, control of the illumination of the component regions is important in the 3-D synthesis of the overall object image. The following is further discussion as to various modes of control of the illumination of particular component regions to vary the effect on the image synthesis.

This first example is a method of selectively controlling a large number of points of the component region in any simultaneous or time-selective manner. In the best mode, this is done by positioning the transparencies of object component regions against the face of a CRT. The illumination of specific small point regions of the component region transparency is controlled by the CRT intensity at a given pre-determined point or points. By selectively illuminating any given subset or subsets of the component region and its time variable intensity, or by a time variable sequencing of various points, selective illumination of any given subset of the 3-D synthesized image is produced. This control is capable of being interactive with a user through a computer input keyboard and allows flexibility in the illumination protocol selected. Depending on the CRT dot size and position, extremely fine boundary control of the transparency subregions can be maintained. In addition, a plurality of transparencies may be placed adjacent the face of the CRT so there is total control of the illumination of the entire 3-D image by a preselected illumination protocol or an interactive control. Where the CRT has color capability, highlighting can be done in contrasting colors or shades. True shade control can also be maintained. In addition, the transparency density regions may be mapped against the dot matrix of the CRT so that individual structures can be highlighted. For example, in the case where a microtome cross-section of a particular organ or tissue structure forms the component regions, a particular tissue structure therein can be selectively highlighted by the mapping against the transparency density. Other examples include isolating small parts of the image for highlighting or sequencing through the various planes of or different objects comprising the overall synthesized 3-D image.

A second method involves the selection of any subset of component regions within a component region or regions having N components. As stated another way, where there are N component regions available, one may select any subset of them to illuminate, thus giving rise to on the order of $2^n$ combination which may be selected to synthesize an image. In most situations only a few of the possible combinations will generate useful images, but consideration of the possibilities indicates the potential of illumination control for high band width rapid synthesis of images.

In the first alternative is the case wherein no two synthesized images contain a component in common. In this case all of the components for all desired images are distinct, and only one unique set of components needs to be illuminated to synthesize a particular object. A given synthesized object image may be composed of one or more components. The objects are general, that is, they may be one type of object in different positions or stages of change, form, color and the like, or they may be entirely different objects. Likewise, the rate of illumination change and the other conditions under which it occurs are also general in nature (intensity, color, and the like). A rapid change of objects may show continuous motion as in 3-D holographic television. A slower change may be employed to display different objects in sequence. Likewise, the change of illumination may be responsive to user input to show, for example, a game character in different places, states, colors, forms, and the like.

A second example of the N-component region illumination control is the case where some component is in common with more than one synthesized image. This illumination control is useful, for example, in showing a part of an object in motion, such as rotation of a gear. Most of the component regions forming the image of the non-moving parts of the machine are illuminated in the manner described above. Only those components corresponding to the different positions of the gear as it changes in time are controlled by appropriate light sequencing to show rotation of that gear or gears in the entire machine. Another example is an interactive game such as maneuvering an object through a maze. Here, the components that create the background may always be "on" while the component region whose illumination is changed pursuant to player manipulation (interaction) synthesized the moving object at different positions within the maze.

The above techniques may be used to "compose" scenes where different parts of the scene may be added or subtracted as desired. For example, this may be useful in advertising display to demonstrate a product associated with a number of other items. By controlling the illumination of the various component regions of these other items, they can be selectively shown with the product being advertised.

A simple example showing the principles of the illumination control described herein may be a measuring instrument such as a meter to measure volts, amperes, ohms, temperature, fuel level, and the like. An array of component regions may be used to synthesize an image of a needle in various angular positions depending on which component region of that array is illuminated responsive to actual input from the meter sensor (voltage, current, fuel level, temperature, etc.). Another array of component regions may be provided, with each array representing a different scale. Depending on the meter function desired to be illustrated, the appropriate component region may be illuminated to synthesize the appropriate meter scale in association with the image of the meter needle. Thus, a single meter location on a control board could be used to selectively image in 3-D synthesis any number of different meters involved in a device, process vehicle, or the like.

In a similar manner, by illumination control dynamic functional signs or displays may be produced which accurately show the state of manufacturing processes, progress of elevators, changes of temperature, and the like. A particularly useful example is where component regions are directly affected by an external stimulus so they do not require specific illumination electronics to turn them "on." A case in point is to employ temperature-sensitive liquid crystals which change color with temperature as the component regions or as the component region illumination means. These may be considered to be self-illuminating. This is particularly useful in 3-D synthesized images of thermograms, for example, as used in industry to identify hot spots in buildings, or in medicine to show inflamation, or in product analysis to show thermal conductivity characteristics, and the like. In effect, 3-D image of scenes are painted with liquid crystals as the color changes with temperature. The resulting 3-D synthesized image contains functional information about the temperature locus in the object or scene being displayed.

The above examples demonstrate the usefulness of illumination control in creating different images. The changes in synthesized images may be realized in other ways, notably by using component regions which themselves may be modified. The best mode of this was described above in connection with the component regions themselves being synthesized images from still other component regions or from other optical systems. Hybrid systems may be produced by combinations of modifiable component regions and control of the illumination changes as described above. The modifiable component regions may not only be turned on or off, and the content of the "on" component region is also controllable as well. Examples include cases where part of an image may not change in time except for its presence or absence which is required to be controlled in a fast and uncomplicated manner. For example, where the object component is itself three dimensional, it is simpler to turn that component on rather than synthesize it (although the component region may itself by a synthesized image).

In other cases it is simpler to provide a real modifiable component which is easy to change in time rather than use an array of component regions which must be controlled. For example, it is easier to use a set of LEDs themselves (in place of an array of component regions representing the LEDs) and modulate the LED display electronically, than it is to have each LED segment as a separate component region to be separately controlled.

Integration Electronics

Generating a full, three-dimensional object image employing a number of planes imaged at different depths is limited by the number of planar slices through the object which may be represented in the component regions. Where the number of component regions is few, the image portion of the object that falls between the planes is absent. This may be described as a problem of definition or resolution. Digital or analog electronics are useful to improve the resolution where the entire object is stored in memory and is available to be manipulated by electronic recall.

In some cases more information about an object may be available or could be developed than can be presented in the number of planes provided by the mcHOE. For example, a computer may have in memory storage 32 planes of a specimen, while only, say, eight HOEs are available to image them. As an aspect of this invention, one may use electronic manipulation by translation and/or rotation of the component regions to provide all of the planes at different, sequenced times to display the full 3-D image.

Full, three-dimensional images such as computer generated objects may be stored in a computer in digital form. This can be projected on a CRT as an isometric projection, either as a framework or as a shaded-in image. "Rotate" controls of the computer permit electronic rotation of the object about a predetermined pivot, say the center of the image. This rotation is performed by digital and analog techniques wherein the intersection of a plane with the object is successively computed with the object being rotated by some defined angle $\theta$. These images are then used as the component regions and illuminated sequentially on a CRT such as in the array shown in FIG. 3.

By way of example, 8 HOEs along with 8 component regions can be used to display 32 planes. First, a predetermined array of 8 spaced planes of the 32 representing the entire object are selected as the component regions and displayed. Then the object is electronically translated one-fourth of the separation between the adjacent pairs of the first array of planes so that a new array of 8 planes intersects the object at different places. These selected planes are displayed. By shifting the object one-fourth of the separation between adjacent planes each time, after four successive shifts all 32 of the planes will be imaged, but of course at different times. At the first time interval the object planes selected to be displayed will be the 1st, 5th, 9th, . . . 29th planes. At the next instant, planes 2, 6, 10, . . . 30 are displayed. Next, planes 3, 7, 11, . . . 31 are displayed, and finally, the 4th, 8th, . . . 32nd are displayed. If all four sets are displayed within the eye's flicker fusion time limit, the object appears fully delimited in 3-D. If the sequencing is slower, motion may be apparent to the viewer, say forward from a back-to-front presentation of arrays in sequence, or backward for a front-to-back presentation.

Likewise, this method is applicable by electronically rotating the object datum to obtain successive arrays of radial or diametral planar slices of the object. At each position of the object rotation, the intersection of the eight available planes with the object is selected or computed, and these planes are displayed on the object component regions. If the sequencing is rapid, the object is filled-in; if slower, the object will appear to rotate.

As the image plane successively "samples" the entire 3-D object at different translation or rotation points, these samples may be displayed as the component regions. By the illumination control described above, the entire 3-D object at different translation or rotation points in space will become apparent by the eye-brain interpretation of a continuous image. At the appropriate sequencing/display speed, this achieves fusion between planes. At slower speeds both rotation and translational motion become apparent as all of the points of the object are imaged. This technique is also susceptible to interactive control to produce a fully controllable 3-D image.

Volume Microscope

In a microscope, the part of the specimen in focus is determined by several factors: the focal lengths of the objective and eyepiece, the distance of the objective from the specimen, and the separation of the eyepiece and objective. The objective is carefully designed and built to have high magnification, and is not a good candidate for replacement by a holographic optical element.

However, in accordance with this embodiment the eyepiece is modified to effectively obtain simultaneous different focal lengths using an HOE. This enables the objective-eyepiece combination to focus simultaneously at different depths within the specimen. This may be achieved by using a mcHOE of this invention that has a number of on-axis component elements of different focal lengths. The mcHOE in this case is constructed by multiple exposures where both reference and object beams are along the optical axis, one of them being moved for each exposure.

Figure 6:
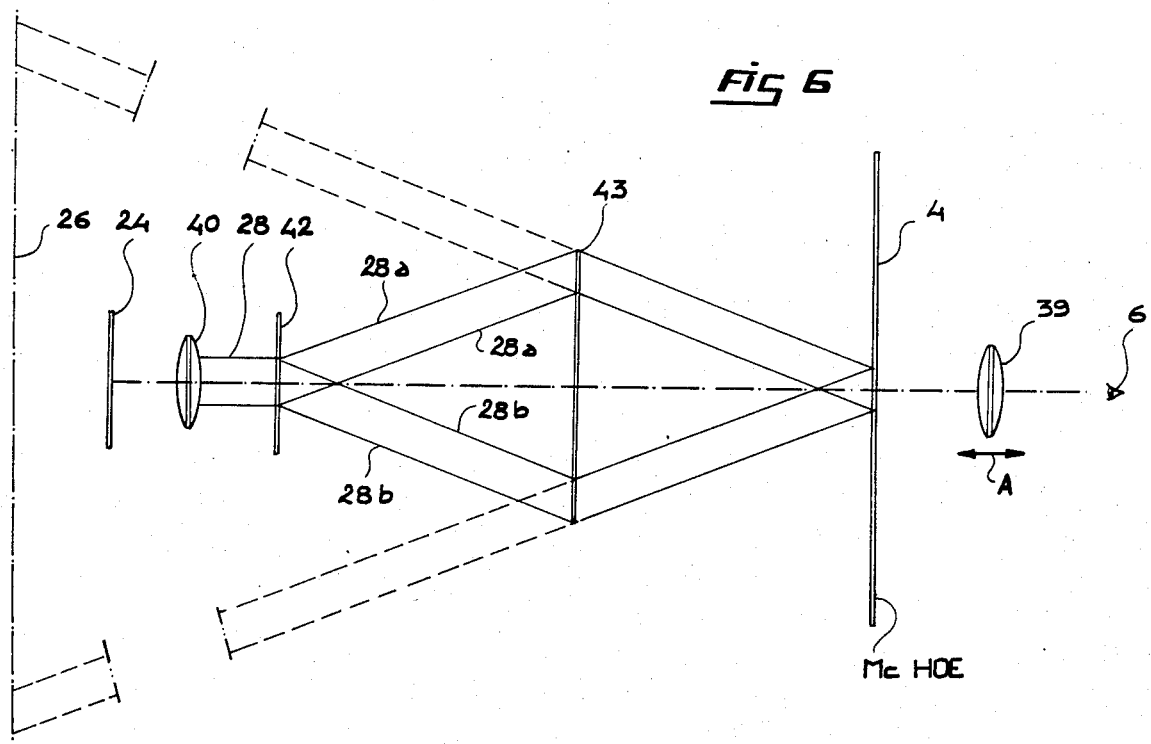
FIG. 6 is a diagrammatic illustration of a volume microscope employing the principles of the invention.

However, I prefer to use an off-axis mcHOE since an on-axis mcHOE would be prone to so-called cross-talk artifacts which degrade the isolation of the separate depth images. Depth isolation is improved by using an optical system to provide objective images to an off-axis mcHOE in the eyepiece. This is shown in FIG. 6 wherein a beam splitter 42, such as a holographic one, splits the beam 28 into a number of off-axis components 28a,b. Then, a second optical element, such as a holographic beam combiner 43 is used to converge each of the off-axis beams toward an off-axis mcHOE 4 which images the beam in eyepiece 39 which has means for control in the directions shown by the arrow A.

Each component hologram in the mcHOE has a unique focal length designed to image its objective beam to a unique place along the optical axis. The set of images thus created will each be of a different plane within the specimen. The eyepiece/off-axis mcHOE combination further magnifies the image 26 of the specimen 24 examined by the objective lens 40.

It should be understood that various modifications within the scope of this invention can be made by one of ordinary skill in the art without departing from the spirit thereof. I therefore wish my invention to be defined by the scope of the appended claims as broadly as the prior art will permit, and in view of this specification if need be.

I claim:

1. Apparatus for synthesizing 3-D images from a related set of 2-D representations comprising in operative combination:
   (a) an off-axis multiple component holographic optical element (mcHOE) having a plurality of holographic optical element (HOE) components, each of which HOE components has a predetermined object space location with respect thereto;
   (b) said mcHOE has a predetermined, defined optical axis passing therethrough, and is disposed to be viewed by an observer along said axis;
   (c) a plurality of selectively illuminable component regions each of which is imageable by a corresponding HOE of said mcHOE and is disposed in the object space of a corresponding HOE of said mcHOE;
   (d) said plurality of component regions being at least a part of a related set of 2-D representations;
   (e) each of said HOE components causes a 2-D image of at least one of the component regions to appear centered along the optical axis at a unique position along the axis spaced from the images of each of the other images of component region set members; and
   (f) means for illuminating preselected ones of said component regions to visually reconstruct for said observer a 3-D virtual or real image in the region of said optical axis.

2. A 3-D image synthesis apparatus as in claim 1 wherein:
   (a) said mcHOE comprises n components; and
   (b) the number of component regions presented in said object spaces ranges from less than n to more than n.

3. A 3-D image synthesis apparatus as in claim 2 wherein:
   (a) each HOE component is a volume phase hologram.

4. A 3-D image synthesis apparatus as in claim 2 wherein:
   (a) the HOE components of individual mcHOEs are multiple lateral exposure, low aberration holographic optical elements.

5. A 3-D image synthesis apparatus as in claim 2 wherein:
   (a) the HOE components of individual mcHOEs are transmission holograms.

6. A 3-D image synthesis apparatus as in claim 5 wherein:
   (a) the HOE components of individual mcHOEs are real image holograms.

7. A 3-D image synthesis apparatus as in claim 5 wherein:
   (a) the HOE components of individual mcHOEs are virtual image holograms.

8. A 3-D image synthesis apparatus as in claim 5 wherein:
   (a) the HOE components of individual mcHOEs are combinations of real and virtual image holograms.

9. A 3-D image synthesis apparatus as in claim 2 wherein said illumination means includes:
   (a) means for separately controlling the illumination of each component region for a predetermined duration and intensity, and in a sequence of predetermined timed intervals.

10. A 3-D image synthesis apparatus as in claim 9 wherein:
    (a) the wavelength of said illumination for each component region reaching said observer is substantially the same as that of the light used in producing its corresponding HOE component.

11. A 3-D image synthesis apparatus as in claim 2 wherein said illumination means includes:
    (a) means for electrically or electronically displaying at least portions of component regions.

12. A 3-D image synthesis apparatus as in claim 11 which includes:
    (a) means for controlling the illumination of said display means.

13. A 3-D image synthesis apparatus as in claim 12 wherein:
    (a) said control means includes means for observer interaction to selectably change the illumination.

14. A 3-D image synthesis apparatus as in claim 13 which includes:
    (a) means for providing a component region for illumination by said illumination means selected from a source of 2-D representations or means for storing a set of 2-D representations or both.

15. A 3-D image synthesis apparatus as in claim 14 wherein
    (a) said image source includes a computer.

16. A 3-D image synthesis apparatus as in claim 2 wherein:
    (a) the component regions are disposed substantially in a plane; and
    (b) said mcHOE is a substantially planar sheet disposed spaced from, and substantially parallel to, the plane of the component regions.

17. A 3-D image synthesis apparatus as in claim 16 wherein:
    (a) said illumination means includes a built-in lighting source.

18. A 3-D image synthesis apparatus as in claim 16 which includes:
    (a) at least one optical element disposed between the observer and the mcHOE to provide for magnification of at least some of the images produced by said mcHOE.

19. A 3-D image synthesis apparatus as in claim 18 wherein:
    (a) at least some of the component regions are 2-D transparencies.

20. A 3-D image synthesis apparatus as in claim 2 wherein:
    (a) at least some of said component regions are either holograms, 3-D images, 3-D objects or combinations thereof.

21. A 3-D image synthesis apparatus as in claim 2 wherein:
    (a) at least some of said component regions respond to an external property and the image synthesized on said region is a representation of the response to said property.

22. A 3-D image synthesis apparatus as in claim 2 wherein:
    (a) said plurality of component regions includes 2-D representations of at least parts of a plurality of 3-D images; and
    (b) the particular 3-D image synthesized is determined by selective control of the illumination of said component regions.

23. A 3-D image synthesis apparatus as in claim 22 wherein:

(a) said component regions show an object changing in time, said change being either change in position, orientation, color, shape, size, or combinations thereof.

24. A 3-D image synthesis apparatus as in claim 1 wherein:
(a) Said component regions correspond to discrete focal depths in a specimen; and which includes in sequence between said specimen and said mcHOE
(b) an objective lens, a beam splitter and a beam combiner; and
(c) an eyepiece lens disposed between said mcHOE and said observer to provide a holographic volume microscope.

25. A 3-D image synthesis apparatus as in claim 2 wherein:
(a) at least portions of some of said component regions are polychromatic; and which includes:
means for predispersing chromatically at least some of said polychromatic portions to compensate for the chromatic aberration of corresponding HOE components of the mcHOE.

26. A 3-D image synthesis apparatus as in claim 25 wherein:
(a) said chromatic predispersing means comprises a HOE component disposed between said polychromatic portion and said mcHOE.

27. A 3-D image synthesis apparatus as in claim 25 wherein said illumination means includes:
(a) means for electrically or electronically displaying at least portions of component regions,
(b) means for controlling the illumination of said display means.

28. A 3-D image synthesis apparatus as in claim 27 wherein:
(a) said control means includes means for observer interaction to selectably change the illumination.

29. A 3-D image synthesis apparatus as in claim 28 which includes:
(a) means for providing a component region, for illumination by said illumination means, which is either a source of 2-D representations, means for storing a set of 2-D representations, or combinations thereof.

30. A 3-D image synthesis apparatus as in claim 2 wherein:
(a) said set of component regions includes component regions of different colors for the same object portion; and
(b) the same object portion of the several component regions are imaged by their corresponding HOE components to overlap in the same image space.

31. A 3-D image synthesis apparatus as in claim 2 which includes:
(a) at least one optical element disposed between the observer and the mcHOE to act on at least some of the images produced by said mcHOE.

32. A 3-D image synthesis apparatus as in claim 31 wherein:
(a) said optical element provides for magnification.

33. A 3-D image synthesis apparatus as in claim 31 or 32 which includes:
(a) means for control of said optical element to permit user interaction for imaging control.

34. A 3-D Image Synthesis apparatus as in claim 2 wherein:
(a) the HOE components of individual mcHOEs are reflection holograms.

35. A 3-D Image Synthesis apparatus as in claim 34 wherein:
(a) the HOE components of individual mcHOEs are real image holograms.

36. A 3-D Image Synthesis apparatus as in claim 34 wherein:
(a) the HOE components of individual mcHOEs are virtual image holograms.

37. A 3-D Image Synthesis apparatus as in claim 34 wherein:
(a) the HOE components of individual mcHOEs are combinations of real and virtual image holograms.

38. A 3-D Image Synthesis apparatus as in claim 2 wherein:
(a) the HOE components of individual mcHOEs are combinations of reflection and transmission holograms.

39. A 3-D Image Synthesis apparatus as in claim 38 wherein:
(a) the HOE components of individual mcHOEs are real image holograms.

40. A 3-D Image Synthesis apparatus as in claim 38 wherein:
(a) the HOE components of individual mcHOEs are virtual image holograms.

41. A 3-D Image Synthesis apparatus as in claim 38 wherein:
(a) the HOE components of individual mcHOEs are combinations of real and virtual image holograms.

42. Method of synthesizing 3-D images comprising the steps of:
(a) providing an off-axis multiple component holographic optical element (mcHOE) having a defined optical axis and comprising a plurality of holographic optical element (HOE) components, each of which HOE components has an object space location;
(b) orienting the mcHOE so said optical axis is in substantial alignment with a defined viewing axis for an observer;
(c) providing a plurality of component regions which are at least a part of a related set of 2-D representations, each of said regions being imageable by a corresponding HOE of said mcHOE;
(d) presenting each of said component regions in the object space of its corresponding HOE to be imaged by said HOE; and
(e) illuminating preselected ones of said component regions to visually reconstruct for said observer a 3-D virtual or real image in the region of said viewing axis.

43. Method as in claim 42 which includes the step of
(a) disposing said component regions substantially in the same plane; and
(b) the orientation of said mcHOE is in a plane substantially parallel to the component regions plane and spaced therefrom.

44. Method as in claim 43 wherein:
(a) at least some of said component regions are presented as transparencies.

45. Method as in claim 42 wherein:
(a) said mcHOE comprises n components; and
(b) the number of component regions presented in said object spaces ranges from less than n to more than n.

46. Method as in claim 45 wherein:
(a) each HOE component is a volume phase hologram.

47. Method as in claim 46 wherein:
(a) the HOE components of individual mcHOEs are transmission holograms.

48. Method as in claim 47 wherein:
(a) the HOE components of individual mcHOEs are real image holograms.

49. Method as in claim 47 wherein:
(a) the HOE components of individual mcHOEs are virtual image holograms.

50. Method as in claim 47 wherein:
(a) the HOE components of individual mcHOEs are combinations of real and virtual image holograms.

51. Method as in claim 46 wherein:
(a) the HOE components of individual mcHOEs are reflection holograms.

52. Method as in claim 51 wherein:
(a) the HOE components of individual mcHOEs are real image holograms.

53. Method as in claim 51 wherein:
(a) the HOE components of individual mcHOEs are virtual image holograms.

54. Method as in claim 51 wherein:
(a) the HOE components of individual mcHOEs are combinations of real and virtual image holograms.

55. Method as in claim 46 wherein:
(a) the HOE components of individual mcHOEs are combinations of reflection and transmission holograms.

56. Method as in claim 55 wherein:
(a) the HOE components of individual mcHOEs are real image holograms.

57. Method as in claim 55 wherein:
(a) the HOE components of individual mcHOEs are virtual image holograms.

58. Method as in claim 55 wherein:
(a) the HOE components of individual mcHOEs are combinations of real and virtual image holograms.

59. Method as in claim 45 wherein:
(a) the HOE components of individual mcHOEs are multiple lateral exposure, low aberration holographic optical elements.

60. Method as in claim 59 wherein:
(a) the HOE components of individual mcHOEs are transmission holograms.

61. Method as in claim 60 wherein:
(a) the HOE components of individual mcHOEs are real image holograms.

62. Method as in claim 60 wherein:
(a) the HOE components of individual mcHOEs are virtual image holograms.

63. Method as in claim 60 wherein:
(a) the HOE components of individual mcHOEs are combinations of real and virtual holograms.

64. Method as in claim 59 wherein:
(a) the HOE components of individual mcHOEs are reflection holograms.

65. Method as in claim 64 wherein:
(a) the HOE components of individual mcHOEs are of real image holograms.

66. Method as in claim 64 wherein:
(a) the HOE components of individual mcHOEs are virtual image holograms.

67. Method as in claim 64 wherein:
(a) the HOE components of individual mcHOEs are combinations of real and virtual holograms.

68. Method as in claim 59 wherein:
(a) the HOE components of individual mcHOEs are combinations of transmission and reflection holograms.

69. Method as in claim 68 wherein:
(a) the HOE components of individual mcHOEs are of real image holograms.

70. Method as in claim 68 wherein:
(a) the HOE components of individual mcHOEs are virtual image holograms.

71. Method as in claim 68 wherein:
(a) the HOE components of individual mcHOEs are combinations of real and virtual holograms.

72. Method as in claim 45 which includes the step of:
(a) displaying at least portions of said component regions on an electrical or electronic display device.

73. A method as in claim 72 which includes the step of:
(a) controlling the sequence of component regions displayed to represent an object changing in time by changes of position, orientation, color, shape, size and combinations thereof.

74. Method as in claim 42 which includes the step of:
(a) separately controlling the illumination of each component region for a predetermined duration and intensity and in a sequence of predetermined timed intervals at a rate which exceeds the flicker fusion threshold of an observer.

75. Method as in claim 40 wherein:
(a) said illumination for each illuminated region is selected so that the wavelength reaching said observer is substantially the same as that of the light used in making its corresponding HOE.

76. Method as in claim 74 which includes the step of:
(a) selective control of the illumination control by said observer.

77. A method as in claim 76 wherein:
(a) said component regions are provided from a source of 2-D representations, means for storing a set of 2-D representations, holographic optical elements, 3-D images, 3-D objects or combinations thereof.

78. A method as in claim 42 wherein:
(a) at least portions of some of said component regions are polychromatic; and which includes the step of
(b) compensating for the chromatic aberration of the corresponding component HOEs.

* * * * *